Patented Aug. 1, 1950

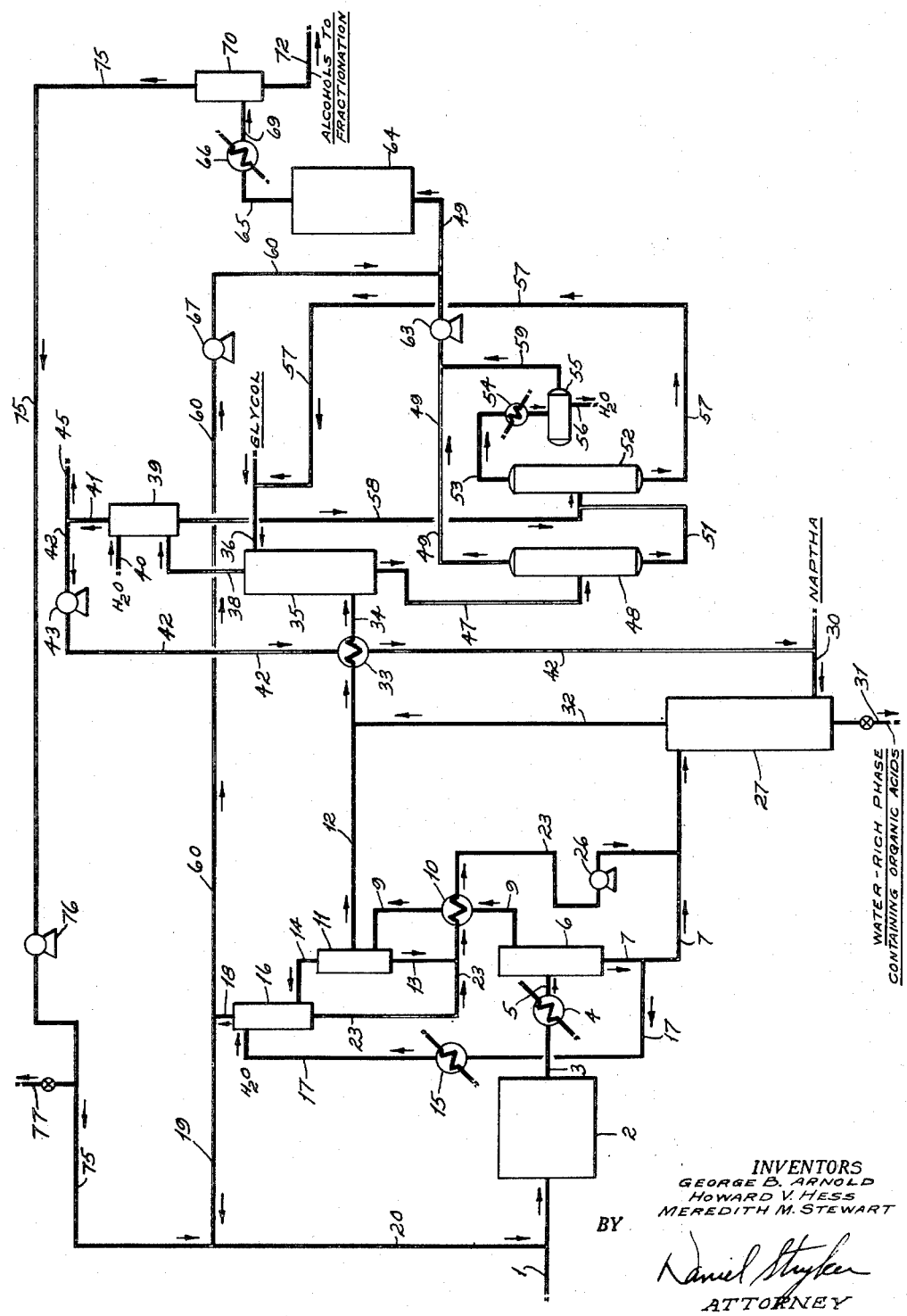

2,516,940

UNITED STATES PATENT OFFICE 2,516,940

METHOD FOR TREATING THE PRODUCTS OF SYNTHESIS GAS CONVERSION

George B. Arnold, Glenham, N. Y., Howard V. Hess, Charleston, W. Va., and Meredith M. Stewart, Somerville, N. J., assignors to The Texas Company, New York, N. Y., a corporation of Delaware Application December 20, 1946, Serial No. 717,346

3 Claims. (Cl. 260—450)

This invention relates to the catalytic conversion of carbon monoxide and hydrogen into hydrocarbons, oxygen-containing compounds and the like. More particularly, the invention proposes a method for recovering the oxygenated compounds produced in said conversion, thereby providing a hydrocarbon fraction substantially free from oxygenated compounds. The catalytic conversion of carbon monoxide and hydrogen ordinarily results in the formation of a complex heterogeneous product consisting of water, normally liquid hydrocarbons, normally gaseous products such as ethane, propane, carbon dioxide, etc., and oxygenated compounds comprising aldehydes, ketones, alcohols, acids and esters. The recovery of the oxygenated compounds from the complex product of synthesis gas conversion is important for two reasons: first, the oxygenated compounds so produced are valuable in their own right as many of them command a premium price; secondly, the presence of oxygenated compounds may be detrimental in the hydrocarbon fraction depending upon the contemplated use of the hydrocarbon, for example, the presence of oxygenated compounds adversely affects the cetane number of Diesel oil. This invention provides a simple procedure whereby oxygenated compounds may be substantially completely recovered from the product of synthesis gas conversion.

In accordance with the invention synthesis gas comprising carbon monoxide and hydrogen is catalytically converted at elevated temperature and pressure and the resulting product mixture comprising hydrocarbons, oxygen-containing compounds, water and the like is separated into an aqueous phase, a liquid hydrocarbon phase and a hydrogen-rich gas phase. The oxygenated hydrocarbons produced in the conversion are present in both the aqueous phase and the hydrocarbon phase with the lower boiling oxygenated compounds concentrated in the aqueous phase and the higher boiling oxygenated compounds concentrated in the hydrocarbon phase. The aqueous phase is subjected to solvent extraction with a hydrocarbon solvent at elevated temperature and pressure with the resulting formation of a water-rich phase containing organic acids and a hydrocarbon-rich phase containing nonacidic oxygenated compounds previously dissolved in the aqueous phase. Organic acids are recovered from the water-rich phase. The hydrocarbon-rich phase is combined with the liquid hydrocarbon phase originally separated from the product mixture and the combined hydrocarbon phases are subjected to secondary solvent extraction with a solvent immiscible with hydrocarbons at extraction conditions with the resulting formation of a secondary hydrocarbon-rich raffinate which is substantially free from oxygenated hydrocarbons and a secondary solvent-rich extract phase containing by far the major portion of the non-acidic oxygenated compounds produced in the conversion. The oxygenated compounds, comprising primarily alcohols, aldehydes and ketones are separated from the secondary solvent-rich extract phase and are then subjected to mild catalytic hydrogenation. The hydrogen-rich gas phase initially separated from the product mixture is advantageously used as the source of hydrogen for the catalytic hydrogenation. Aldehydes and ketones are thereby converted to alcohols which thereafter may be separated into individual components by close fractionation. At least a portion of the tail gas from hydrogenation of the oxygenated compounds may be recycled to the catalytic conversion of synthesis gas.

In the preferred mode of operation, synthesis gas comprising carbon monoxide and hydrogen in the ratio of about 1:2 is converted by contact with the catalyst at elevated temperatures in the range of 200 to 750° F. and at pressures ranging from atmospheric to about 2,000 pounds per square inch into a complex product mixture which is separated at an elevated temperature in the range of about 175 to 300° F. and at substantially reaction pressure, into an aqueous phase, a hydrocarbon phase and a gas phase. The oxygenated products of conversion are displaced more towards the hydrocarbon phase by separation at an elevated temperature and pressure than when the separation is effected at atmospheric conditions. A substantial portion of the low boiling non-acidic oxygenated compounds, which would be found in the aqueous phase which separates at atmospheric conditions, migrate to the hydrocarbon phase when high temperature and pressure separation is employed. Thereafter the aqueous phase is subjected to solvent extraction with a hydrocarbon fraction whereby residual non-acidic oxygenated compounds are extracted from the aqueous phase. Effecting the initial separation at elevated temperature and pressure reduces the burden on the extraction step and allows the use of smaller solvent dosages, smaller extraction towers, etc., therein.

An essential feature of the invention resides in the extraction of oxygen-containing compounds such as alcohols, aldehydes and ketones from the aqueous phase of the products with a hydrocarbon liquid such as petroleum naphtha; advantageously the hydrocarbon solvent comprises the normally liquid hydrocarbons including naphtha and higher boiling hydrocarbons which are produced in the synthesis of hydrocarbons from carbon monoxide and hydrogen. Synthesis naphtha which consists essentially of aliphatic hydrocarbons and which is usually substantially free from aromatic and naphthenic hydrocarbons has been found effective for this purpose. It is contemplated that synthesis hydrocarbons boiling in the range of gas oil are also suitable as extractive solvents for the aqueous phase.

The gas phase from the catalytic conversion of synthesis gas ordinarily contains an excess of hydrogen when the synthesis gas contains hydrogen and carbon monoxide in the ratio of 1.5 to 1 or higher. We find that this gas stream which contains a substantial proportion of hydrogen serves excellently as the source of hydrogen in the catalytic hydrogenation of the oxygenated products of conversion. Correspondingly, at least a portion of the gas phase separated from the products of conversion is advantageously used for the catalytic hydrogenation of the oxygenated products. Another portion of this gas phase may be directly recycled to the catalytic conversion of synthesis gas.

We also find that the tail gas from the catalytic hydrogenation of oxygenated products serves well as a recycle gas in the catalytic conversion of carbon monoxide and hydrogen. The consumption of hydrogen during hydrogenation results in the adjustment of the hydrogen to carbon monoxide ratio in this gas stream so that the $H_2$ to CO ratio more closely approximates the 2:1 ratio ordinarily used.

The oxygenated products produced by the catalytic conversion of synthesis gas are ordinarily discolored and characterized by an unpleasant odor. We have found that hydrogenation of the oxygenated products in the manner described in this invention results in clarification of both the color and odor of the oxygenated products. It appears that hydrogenation destroys both the odoriferous and chromophoric bodies.

As has been mentioned previously, hydrogenation results in conversion of the aldehydes and ketones into primary and secondary alcohols respectively. The transformation of the aldehydes and ketones into alcohols makes feasible the fractionation of the oxygenated products into individual components.

After the hydrogenated oxygen-containing products of conversion are separated into individual compounds by fractionation, an individual primary or secondary alcohol thus isolated may be oxidized to form an aldehyde or a ketone respectively.

In order that the invention may be more fully understood, it will now be described in connection with a flow diagram wherein a preferred modification is depicted in detail.

Carbon monoxide and hydrogen in the molecular ratio of about 2 mols of hydrogen to about 1 mol of carbon monoxide are obtained from a source not shown, through a pipe 1, and introduced into a synthesis unit 2. In the synthesis unit 2, the reactants may be subjected to contact with a synthesis catalyst in the form of a fluidized mass of solid particles or powder. A catalyst having iron as its main constituent is advantageously used to effect this conversion although other synthesis catalysts containing cobalt or nickel may be employed. The synthesis catalyst may also comprise alkali metal compounds and the oxides of metals such as thorium, magnesium, aluminum, uranium and vanadium.

A catalyst having the composition of about 94 to 98% iron, about 2 to 3% alumina and about 0.1 to 3% alkali expressed as potassium oxide has been found to be particularly effective for the conversion. Synthesis reaction with such a catalyst is usually carried out at a temperature of about 500 to 700° F. and under a pressure of about 150 to 300 pounds per square inch when liquid hydrocarbons boiling within the gasoline range are the primary product of conversion.

An effluent stream comprising unreacted synthesis gas and products of synthesis reaction, the organic portion of which comprises mainly compounds having from 1 to 20 carbon atoms per molecule, leaves the synthesis unit 2 through a pipe 3 and is cooled to a temperature of about 175° to 300° F. and preferably to about 200° to 225° F. in an exchanger 4. As has been indicated previously, the effluent may be cooled to about atmospheric temperature at this point but this not only places an added burden on the extraction of the aqueous phase but also necessitates the reheating of the aqueous phase prior to its extraction.

The total product is introduced through a pipe 5 into a separator 6 wherein the aqueous phase is separated from both the normally liquid hydrocarbon phase and the normally gaseous products of conversion. The separator 6 is maintained, for example, at a temperature of about 200° F. and at a pressure of about 150 to 300 pounds per square inch, which advantageously is substantially equivalent to that existing in the synthesis unit 2. The aqueous phase is withdrawn from the separator 6 through a conduit 7. Both the gas phase and the liquid hydrocarbon phase are removed from the upper portion of the separator 6 through a pipe 9 and are cooled and expanded to atmospheric conditions in the exchanger 10 prior to their introduction into a secondary separator 11 which is maintained at atmospheric conditions. In the separator 11, the liquid hydrocarbon phase is separated from the gas phase. The liquid hydrocarbon phase is withdrawn from the separator 11 through a pipe 12 and its further treatment will be described more in detail later. The gas phase containing normally gaseous products of conversion such as ethane, methane, carbon dioxide, etc., leaves the separator 11 through a pipe 14. Some additional aqueous phase separates in the secondary atmosphere separator 11 and is withdrawn therefrom through a pipe 13.

The gas phase is introduced into a scrubbing tower 16 wherein it is advantageously washed with a small quantity of water so as to separate entrain water-soluble low boiling oxygenated compounds such as acetaldehyde from the gas phase. A portion of the water phase withdrawn from the separator 6 can be used to wash the gas phase. To this end, a portion of the water phase can be diverted from the conduit 7 to a pipe 17 through which it is introduced into the upper portion of the scrubber 16 after having been cooled in an exchanger 15. The washed gas phase leaves the scrubbing tower 16 through a pipe 18. The use of at least a portion of this gas phase for the catalytic hydrogenation of the oxygen-containing products will be described in detail later. Another portion of this gas phase may be directly recycled to the synthesis unit through pipes 19 and 20 which connect with the feed pipe 1 to the converter 2.

The water wash leaves the scrubbing tower 16 through a pipe 23 and combines with the water separated in the secondary separator 11. The combined water phases are heat exchanged in the exchanger 10 and are raised to a pressure of about 200 pounds per square inch in the pump 26 and thereafter flow into the conduit 7 wherein it joins the aqueous phase initially separated from the products in the separator 6. The combined aqueous phases are then introduced into an extraction tower 27.

In the extraction tower 27, the combined aqueous phases are subjected to countercurrent extraction at about 200° F. and at about 200 pounds per square inch with a hydrocarbon solvent such as naphtha introduced therein through a pipe 30. Under these conditions, non-acidic oxygenated organic compounds are substantially extracted from the water phase. As a result of the countercurrent extraction in the tower 27, there are formed a hydrocarbon-rich extract phase containing non-acidic oxygenated organic compounds and a water-rich phase containing low molecular weight organic acids.

The hot water-rich phase contains substantially all of the low molecular weight organic acids which comprise acids containing up to 4 carbon atoms per molecule and also low molecular weight non-acidic oxygenated compounds, mainly ethyl alcohol. This phase is withdrawn from the extraction tower 27 through a pipe 31 and the residual low boiling non-acidic oxygenated compounds still dissolved therein may be removed as aqueous azeotropes by flashing in a flash tower, not shown. Thereafter, the water-rich phase can be introduced into a fractionating tower, not shown, in which the water may be distilled from the organic acids by azeotropic distillation with a hydrocarbon fraction. The organic acids may then be separated into individual components by fractionation.

The hydrocarbon-rich extract phase containing extracted non-acidic oxygenated organic compounds leaves the extraction tower 27 through a pipe 32. This extract phase proceeds along the pipe 32 and combines in the pipe 12 with the hydrocarbon phase initially separated from the products of conversion. The combined mixture is advantageously cooled and expanded to atmospheric conditions in an exchanger 33 and is thereafter introduced through a pipe 34 into a secondary extraction tower 35.

The combined hydrocarbon phases, containing substantially all of the non-acidic oxygenated compounds produced in the conversion which includes aldehydes, ketones, alcohols and esters, are subjected to extraction with a solvent for the oxygenated compounds which is immiscible with hydrocarbons under operating conditions. The secondary extraction tower 35 is advantageously packed with contact material. A solvent, such as a glycol, is introduced into the extraction tower 35 through a pipe 36 and therein is contacted countercurrently with the hydrocarbon solution of oxygenated compounds flowing upwardly therethrough. As a result of this secondary extraction, there are formed a hydrocarbon-rich raffinate which is substantially free from oxygenated compounds and a solvent-rich extract phase containing most of the alcohols, aldehydes and ketones produced in the process, in addition to some of the ester products.

Ethylene glycol has proved to be an excellent solvent for effecting the extraction of aldehydes, ketones and alcohols from the hydrocarbon solution. However, it is contemplated that other hydrocarbon-immiscible solvents such as polyolefin glycols, aldehydes such as furfural, ketones such as acetone, and nitro hydrocarbons such as nitro-methane may be employed for the solvent extraction of the alcohols, aldehydes and ketones from the hydrocarbon solution. In further description of the invention, it will be assumed that ethylene glycol has been used to effect the extraction of the oxygenated compounds from the hydrocarbon phase.

The hydrocarbon-rich raffinate is withdrawn from the upper portion of the extraction tower 35 through a pipe 38 and is thereafter washed in a wash tower 39 with water for the removal of any glycol which may be dissolved therein. To this end, water is introduced into the wash tower 39 through a pipe 40 in the ratio of about 1 volume of water to 10 volumes of hydrocarbon. The washed hydrocarbons are withdrawn from the upper portion of the wash tower 39 through a pipe 41. A portion of this hydrocarbon fraction which is substantially free from oxygenated compounds can be used to effect the extraction of oxygenated compounds from the water phase in the primary extraction tower 27. Accordingly, a portion of the washed hydrocarbon solution is diverted from the pipe 41 through a pipe 42 which pipe communicates with pump 43 and exchanger 33 wherein the hydrocarbon fraction is raised to a pressure of about 200 pounds per square inch and a temperature of about 200° F. Thereafter this hydrocarbon fraction at elevated temperature and pressure flows into the pipe 30 and from there into the primary extraction tower 27.

The remainder of the washed hydrocarbons obtained from the wash tower 39 pass through a pipe 45 to storage, not shown. Thereafter they may be fractionated to form gasoline and Diesel fuel and subjected to such other treatment as will improve the quality of the fuel for commercial uses.

Solvent-rich extract phase containing dissolved therein alcohols, aldehydes and ketones is withdrawn from the lower section of the secondary extraction tower 35 through a pipe 47 and is introduced into a fractionating tower 48. Therein the alcohols up to and including $C_7$ alcohols, aldehydes and ketones distilling below the boiling point of ethylene glycol, viz., about 385° F. are separated by fractional distillation from the solvent and from higher boiling oxygenated compounds. The low boiling oxygenated compounds are removed as a distillate from the fractionating tower 48 through a pipe 49. This distillate combines with the higher boiling oxygenated compounds which are separated from the glycol solvent in a manner which will be immediately hereafter described.

The glycol solution of higher boiling oxygenated compounds is removed from the bottom portion of the fractionating tower 48 through a pipe 51 and is introduced into a distilling tower 52. The wash water from the wash tower 39 containing ethylene glycol and oxygenated compounds is also introduced into the distilling tower 52 through a pipe 53 which communicates with the pipe 51. In the distilling tower 52 higher boiling alcohols, aldehydes and ketones are steam distilled from the ethylene glycol solvent as water azeotropes which leave the tower 52 through a pipe 53 and flow into a settler 55 after condensation in an exchanger 54.

Glycol from which the higher boiling oxygen-containing compounds have been steam distilled is withdrawn from the distilling tower 52 through a pipe 57 and is therethrough recycled to the secondary extraction tower 35. The pipe 57 communicates with the pipe 36 which serves as the entry pipe for the hydrocarbon-immiscible solvent.

Since the high boiling oxygenated compounds are only sparingly soluble in water, they are readily separated from the condensate consisting of water and high boiling oxygenaed compounds. Water is withdrawn from the lower portion of the settler 55 through a pipe 56. The higher boiling oxygenated compounds are withdrawn from the settler 55 through a pipe 59 and thereafter combine in the pipe 49 with the low boiling oxygenated compounds. The combined stream comprises most of the alcohols, aldehydes and ketones produced in the conversion, together with minor amounts of esters.

A portion of the hydrogen-rich gas phase which is withdrawn from the wash tower 16 through a pipe 18 can be added to the stream of oxygenated products. As has been pointed out previously, this gas stream is rich in hydrogen and serves excellently as a source of hydrogen for the catalytic hydrogenation of aldehydes and ketones to alcohols. Accordingly a portion of the gas phase is diverted from the pipe 18 through a pipe 60 and is added to the oxygenated compounds in the conduit 49. In the pipe 60, there is placed a compressor 67 wherein the H₂-containing gas is raised to a pressure of about 200 to 1,000 pounds per square inch since the hydrogenation is advantageously effected at elevated pressure. The pump 63 placed in the conduit 49 serves to raise the oxygenated compounds to an equivalent pressure prior to the mingling of the liquid and the gas streams.

The resulting mixture containing oxygenated products is introduced into a hydrogenating vessel 64. The vessel 64 is maintained at a temperature of about 200 to 400° F. and at a pressure in the range of 200 to 1,000 pounds per square inch.

The precise operating conditions of temperature and pressure maintained in the vessel 64 depend upon the catalyst that is employed to effect the hydrogenation of aldehydes and ketones to their alcoholic analogs. Among the catalysts that may be employed to effect this hydrogenation are metallic type catalysts such as nickel or platinum, supported metallic type catalysts such as nickel on kieselguhr, metallic oxide catalysts such as copper oxide or molybdena and supported metallic oxide catalysts such as molybdena on alumina or tungsten on alumina.

The hydrogenation in the vessel 64 may be effected either batch-wise or continuously. A continuous mode of operation is represented in the diagram. The hydrogenation results in clarification of both the color and odor of the oxygen-containing compounds.

The effluent from the vessel 64 comprises mainly alcohols and gas, the latter being of reduced hydrogen content and containing carbon monoxide, carbon dioxide, methane, ethane, etc.

The effluent from the vessel 64 is introduced into an exchanger 66 through a pipe 65 wherein the oxygenated products are condensed. Thereafter the effluent is introduced through a pipe 69 into a separator 70 in which condensed alcohols are separated from the normally gaseous compounds.

The alcohols are withdrawn from the separator 70 through a pipe 72. Thereafter the alcohols comprising mainly primary alcohols and some secondary alcohols are fractionated into component compounds. The individual primary alcohols may be converted later to the corresponding aldehydes or acids by controlled oxidation and the individual secondary alcohols may liksewise be converted into corresponding ketones.

The gas stream separated from the condensate in the separator 70 and removed therefrom through a pipe 75 contains a hydrogen to carbon monoxide ratio which approximates that of the fresh feed introduced into the synthesis unit through the pipe 1. Moreover, it contains a substantial percentage of carbon dioxide which is an advantageous constituent of the feed to the synthesis unit. Consequently, this gas stream proves advantageous as a recycle gas to the synthesis unit 2. To this end, the gas stream is pumped through a pipe 75 by means of a pump 76 and is introduced into the pipe 20 through which recycle gas is introduced into the synthesis unit 2. A vent 77 provides means of withdrawing any portion of this gas stream which is not used for recycle.

While not specifically mentioned, it is contemplated that the countercurrent extraction operations carried out in the extractors 27 and 35 may involve employment of extract recycle and suitable temperature gradients in the extraction towers. Solvent dosages may vary from those mentioned as may the temperatures while sufficient pressure is maintained to preserve substantially liquid phase operations.

The invention has been described in detail with reference to a synthesis operation whose primary objective is the production of hydrocarbons, but it is contemplated that the invention may be utilized in connection with a synthesis operation carried out under conditions adapted primarily for the production of oxygen-containing compounds. Nor is the synthesis reaction confined to an operation employing a fluidized mass of catalyst. The method proposed in the invention for the recovery of oxygenated compounds applies equally well whether the catalyst is employed in the form of a stationary bed, a moving bed or a suspension in the reactants.

It is further contemplated that the hydrogenation of the oxygenated compounds may be effected with a hydrogen-containing gas other than the gas phase separated from the products; for example, synthesis gas itself or a gas comprising essentially hydrogen may be used to effect this hydrogenation. If synthesis gas is used to effect the hydrogenation, the tail gas therefrom may be recycled to the synthesis unit.

In the description of the invention, the glycol extraction of the oxygenated compounds does not effect removal of all the esters, but does remove the major portion of the aldehydes, ketones and alcohols present in the hydrocarbon solution. If the retention of esters in the hydrocarbons is undesired, they may be removed therefrom by saponification whereby alcohols and water-soluble salts of organic acids are formed. The salts of the organic acids may be removed by water washing and non-water soluble alcohols may be removed by glycol extraction as has been described.

The hydrogenation of the aldehydic and ketonic products of conversion to alcohols has been pictured in the detailed description of the invention as taking place subsequent to the separation of the oxygenated compounds from the secondary extract phase wherein they have been placed by the extraction of the hydrocarbon solution; however, it is contemplated that this hydrogenation step may be effected while oxygenated compounds are still dissolved in the extractive solvent such as glycol which is used to extract the oxygenated compounds from the hydrocarbon solution. If the hydrogenation is effected while the oxygenated products are still dissolved in the extractive solvent, alcoholic products are removed therefrom in the same manner as has been described for the mixture of oxygenated products, namely alcohols up to and including $C_7$ alcohols which distill below the boiling point of glycol are directly fractionated therefrom while the higher boiling alcohols are steam distilled from the glycol solution.

Moreover, the hydrogenation of the oxygenated products of conversion may be effected while the oxygenated products are still dissolved in the composite hydrocarbon phase. This procedure is ordinarily not followed when gasoline hydrocarbons are the primary products of conversion because hydrogenation of the composite hydrocarbon phase not only converts aldehydes and ketones to alcohols but also converts olefins of higher octane rating to paraffins of lower octane rating. However, if hydrogenation should not deleteriously affect the quality of the hydrocarbon solvent, it is feasible to hydrogenate the oxygenated products while still present in the hydrocarbon solution and such a procedure is included within the scope of the invention.

Obviously many modifications and variations of the invention, as hereinbefore set forth, may be made without departing from the spirit and scope thereof and, therefore, only such limitations should be imposed as are indicated in the appended claims.

We claim:

1. In the catalytic conversion of carbon monoxide and hydrogen into a mixture of hydrocarbons, oxygen-containing compounds, water and the like, the method which comprises effecting conversion of carbon monoxide and hydrogen at elevated temperature and pressure in a reaction zone into a product mixture comprising aforesaid substances and including some aldehydes and ketones, separating said product mixture into an aqueous phase, a liquid hydrocarbon phase and a gas phase at elevated temperature of about 175 to 300° F. and at a pressure sufficient to substantially maintain normally liquid products in the liquid phase, subjecting said aqueous phase containing a substantial portion of said oxygen-containing compounds to solvent extraction with a hydrocarbon solvent in an extraction zone at an elevated temperature of about 175 to 300° F. and at a pressure sufficient to maintain normally liquid compounds in the liquid phase, thereby forming a hydrocarbon-rich extract phase containing non-acidic oxygen-containing organic compounds and a water-rich phase containing organic acids, separating said last two mentioned phases, combining said hydrocarbon-rich extract phase with said liquid hydrocarbon phase initially separated from said product mixture, subjecting said combined hydrocarbon phases to catalytic hydrogenation with a portion of said gas phase initially separated from said product mixture so as to convert aldehydes and ketones to alcohols and separating alcohols from said combined hydrocarbon phases.

2. In the catalytic conversion of carbon monoxide and hydrogen into a mixture of hydrocarbons, oxygen-containing compounds, water and the like, the method which comprises effecting conversion of carbon monoxide and hydrogen at elevated temperature and pressure in a reaction zone into a product mixture comprising aforesaid substances and including some aldehydes and ketones, separating said product mixture into an aqueous phase, a liquid hydrocarbon phase and a gas phase at elevated temperature of about 175 to 300° F. and at a pressure sufficient to substantially maintain normally liquid products in the liquid phase, subjecting said aqueous phase containing a substantial portion of said oxygen-containing compounds to solvent extraction with a hydrocarbon solvent in an extraction zone at an elevated temperature of about 175 to 300° F. and at a pressure sufficient to maintain normally liquid compounds in the liquid phase, thereby forming a hydrocarbon-rich extract phase containing non-acidic oxygen-containing organic compounds and a water-rich phase containing organic acids, separating said last two mentioned phases, combining said hydrocarbon-rich extract phase with said liquid hydrocarbon phase initially separated from said product mixture, subjecting said combined hydrocarbon phases to solvent extraction with a hydrocarbon-immiscible organic oxygen-containing solvent, forming a solvent-rich extract phase containing non-acidic oxygen-containing compounds produced in the conversion and a hydrocarbon-rich raffinate which is substantially free from oxygen-containing compounds, subjecting said solvent-rich extract phase to catalytic hydrogenation with a portion of said gas phase initially separated from said product mixture so as to convert aldehydes and ketones to alcohols and separating alcohols from said extract phase.

3. A process according to claim 2 in which the off-gas from the catalytic hydrogenation of the solvent-rich extract phase is recycled to the reaction zone wherein carbon monoxide and hydrogen are converted into hydrocarbons, oxygen-containing compounds and the like.

GEORGE B. ARNOLD.
HOWARD V. HESS.
MEREDITH M. STEWART.

REFERENCES CITED

The following references are of record in the file of this patent:

UNITED STATES PATENTS

| Number | Name | Date |
|---|---|---|
| 1,684,640 | Schmidt et al. | Sept. 18, 1928 |
| 1,870,816 | Lewis | Aug. 9, 1932 |
| 1,979,841 | Pier et al. | Nov. 6, 1934 |
| 2,059,495 | Smeykal | Nov. 3, 1936 |
| 2,083,125 | Scheuble | June 8, 1937 |
| 2,171,324 | Zetzsche et al. | Aug. 29, 1939 |
| 2,274,750 | Soenksen | Mar. 3, 1942 |